United States Patent [19]

Paskerian

[11] E Patent Number: Re. 31,799

[45] Reissued Date of Patent: Jan. 15, 1985

[54] FRAME HANGER

[75] Inventor: Wayne H. Paskerian, West Somerville, Mass.

[73] Assignee: M. W. Carr & Co., Inc., West Somerville, Mass.

[21] Appl. No.: 579,256

[22] Filed: Feb. 13, 1984

Related U.S. Patent Documents

Reissue of:

[64] Patent No.: 3,965,600
Issued: Jun. 29, 1976
Appl. No.: 554,400
Filed: Mar. 3, 1975

[51] Int. Cl.[3] ..... G09F 1/12

[52] U.S. Cl. ..... 40/152.1; 248/489; 248/496; 40/617

[58] Field of Search ..... 40/152, 152.1, 128, 40/155; 248/497, 496

[56] References Cited

U.S. PATENT DOCUMENTS

| | | | |
|---|---|---|---|
| 1,739,057 | 12/1929 | Bock | 40/617 |
| 2,075,588 | 3/1937 | Meyers | 40/152 |
| 3,218,747 | 11/1965 | Cornfield | 40/152.1 |
| 3,552,708 | 6/1976 | Hillstrom | 40/152.1 |

FOREIGN PATENT DOCUMENTS

| | | | |
|---|---|---|---|
| 92504 | 10/1959 | Netherlands | 40/152.1 |

*Primary Examiner*—Gene Mancene
*Assistant Examiner*—Wenceslao J. Contreras

[57] ABSTRACT

Picture frame assembly comprising a frame element having inwardly facing, opposed, generally U-shaped grooves in its opposite sides and a similar groove in one end, and a rigid back plate slidably receivable within the grooves, and an integral hanging clip having a U-shaped retaining portion slideably positioned between one of the grooves and one of the edges of the back plate, a spacing portion and a hanging portion extending inwardly from the frame element, offset from the exterior of the back plate, for receiving an external hanging device.

10 Claims, 5 Drawing Figures

FRAME HANGER

Matter enclosed in heavy brackets [ ] appears in the original patent but forms no part of this reissue specification; matter printed in italics indicates the additions made by reissue.

BACKGROUND OF THE INVENTION

This invention relates to an improved picture hanger. More particularly, it relates to an assembly which may be either integral with or attached to a frame during its manufacture to provide both a laterally adjustable, rugged hanger and a decorative backing for the frame. An example of a picture hanger which is somewhat related to the invention herein disclosed may be found in U.S. Pat. No. 2,875,542 to J. R. Peach.

SUMMARY OF THE INVENTION

Picture hangers embodying this invention may be attached to a frame by a consumer or may be adapted for incorporation into the frame by the frame manufacturer. When the frame and hanger are purchased as a unit, a hanger is provided which may be either hung on a screw or nail or suspended from a wire, may be adapted for either vertical or horizontal hanging of picture frames and may be easily adjusted to compensate for unbalanced weight distribution in the frame or its contents, all without the use of tools. By a simple procedure, likewise requiring no tools, a frame hung vertically may be removed from the wall, have its contents replaced, and be rehung horizontally. Additionally, the invention provides an improved frame appearance in that the hanger is designed to remain out of sight behind the picture on even the most narrow frame designs, and a decorative backing is provided. A frame manufacturer may easily utilize the invention with frames of various sizes and weights to provide durable and strong assemblies which are simple and inexpensive to manufacture.

In general, the invention is directed to a picture frame assembly and hanging clip therefor. The frame assembly comprises a frame element having inwardly facing, opposed recesses, preferably in the form of generally U-shaped grooves, in its opposite sides, with a similar groove in one end, all grooves being in a common plane, and a rigid back plate having front and rear faces, with its side edges and one end edge being slideably receivable within the grooves of the frame element through its open end. The integral hanging clip has a U-shaped retaining portion slideably retained between one of the grooves and one of the plate edges, an offset spacing portion extending away from the frame element and a hanging portion spaced from the exterior face of the back plate for receiving an external hanging device between the clip and the back plate to support the assembly from a wall or the like. In preferred embodiments, the frame element may be rigidly secured to the rear face of a frame or may be an integral part of the frame; the hanging portion of the clip may have a notch, slot or hole on its lower edge for receiving a nail; and the retaining portion of the clip may have gripping means for engaging the back plate.

Other advantages and features of the invention will be apparent from the description and drawings herein of a preferred embodiment thereof.

DESCRIPTION OF THE PREFERRED EMBODIMENT

Figure 5:
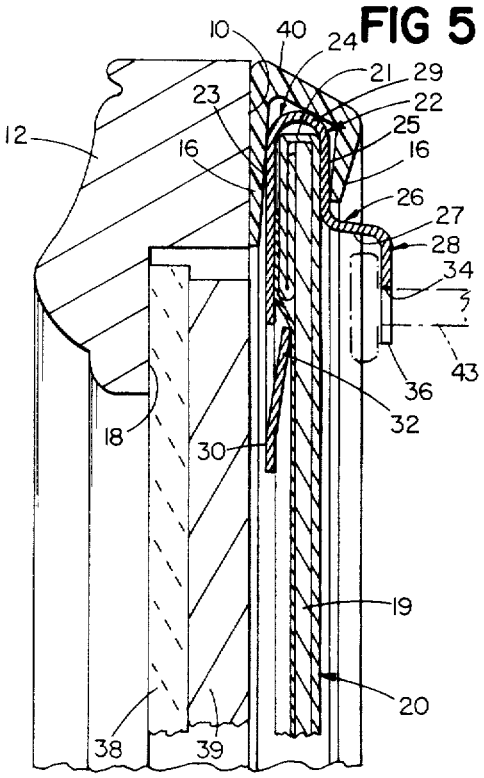
FIG. 5 is a section of the assembly of the invention taken along line 5—5 of FIG. 2.

Referring to the drawings, a three-sided frame element 14 defining inwardly facing opposed grooves 40, 42 and end groove 44 is rigidly secured to the rear face 10 of a frame 12 of wood, metal, plastic or the like. As seen in FIG. 5, one of the sides 16 of grooves 40, 42 and 44 may taper inwardly to improve its frictional engagement with the back plate. Frame element 14 is manufactured by extruding a resilient plastic material to form a continuous grooved strip. The strip is then cut to fit the desired frame lengths, mitered to form corners, and rigidly attached by stapling, gluing, tacking, or the like to provide said inwardly facing, opposed, generally U-shaped grooves 40, 42 and 44. The dimensions and strength of the strip will vary depending on the weight of frame 12 and on the width of its rear face 10. Alternatively, the frame may be directly grooved, without utilizing an auxiliary plastic strip, or auxiliary strips of wood or metal may be utilized, with the desired frictional engagement being accomplished by adding layers of sheet filler material 39, such as cardboard, between the front glass and back plate of the frame.

Back plate 20 comprises a rigid, flat piece of cardboard or the like with a decorative covering on its exterior face 19. Its thickness may be slightly greater than the distance between the inside edges of sides 16 which define grooves 40, 42 and 44 to aid its frictional engagement or intermediate layers of sheet filler material 39 may be used for this purpose as noted above. The length and width of back plate 20 are chosen to slide snugly within frame element 14.

Hanging clip 22 is formed from an integral, single piece of thin, resilient sheet metal or plastic and comprises a U-shaped retaining portion 24 having spaced parallel legs, inner leg 23 and outer leg 25 with connecting semi-circular loop 29, a spacing portion 26 at the terminal end of outer leg 25 extending away from inner leg 23, and an inwardly directed hanging portion 28 extending from spacing portion 26 in the same direction as inner leg 23 and parallel thereto and offset from outer leg 25. The inner leg 23 of retaining portion 24 fits between back plate 20 and the inner side of groove 40, 42 or 44, its semicircular connecting loop 29 over the edge 21 of back plate 20; and its outer leg 25 fits between back plate 20 and the outer side of groove 40, 42, or 44 of frame element 14. Retaining portion 24 inner leg 23 has an extension 30 having a sharp-edged, crescent-shaped cutout 32 bent slightly toward outer leg 25 and hanging portion 28 providing a gripping element. Spacing portion 26 serves to position the upper part of frame 12 offset a short distance from the wall upon the frame is to be hung and provides a lip 27 for receiving a suspension wire. Hanging portion 28 at its free end has a notch 34 on its lower edge 36 for receiving a nail or screw 43 affixed to the hanging site.

Figure 1:
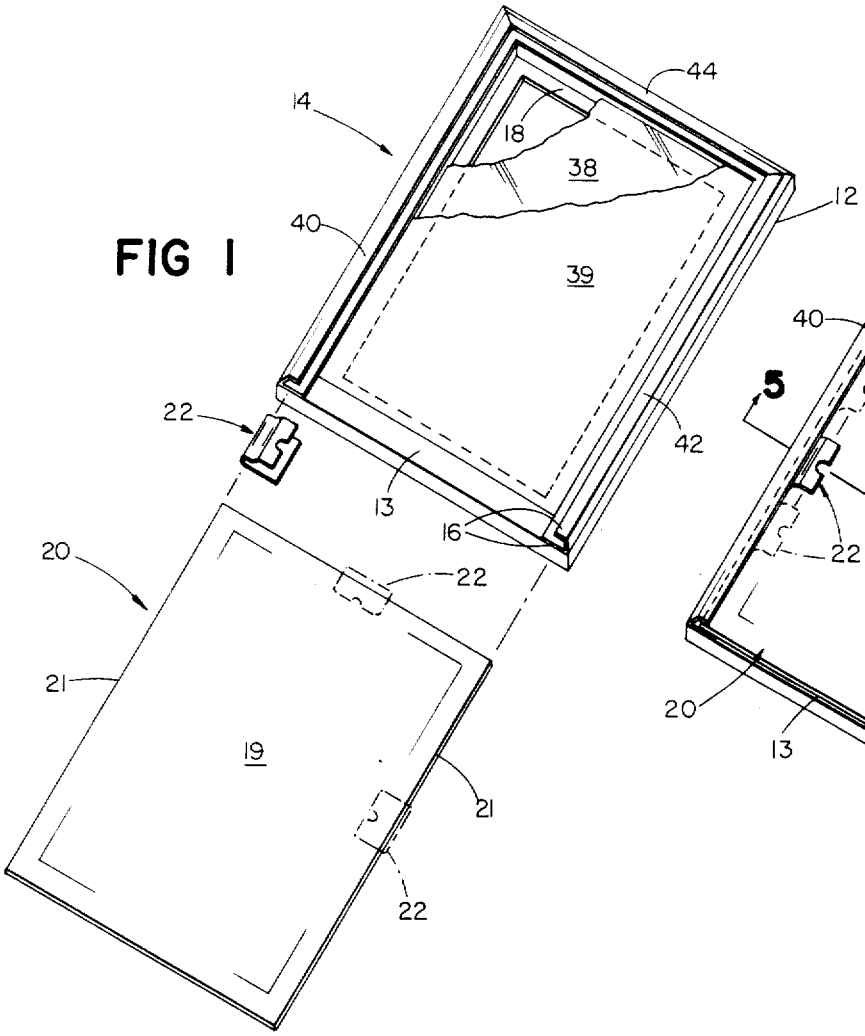
FIG. 1 is an exploded perspective view of a picture frame including the assembly and clip of the present invention.
Figure 2:
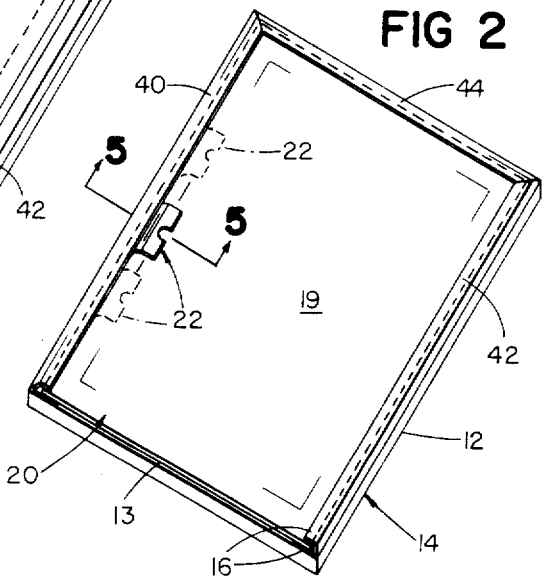
FIG. 2 is a perspective view of the assembled frame of FIG. 1 ready for hanging.
Figure 3:
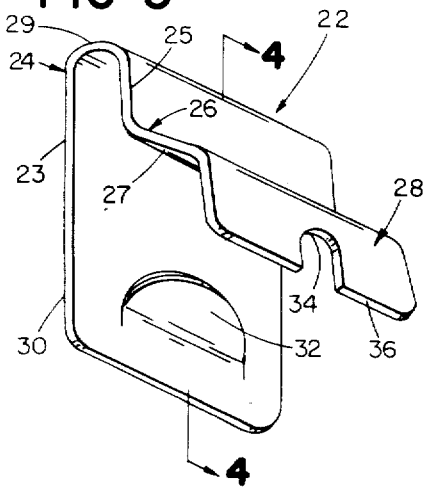
FIG. 3 is a perspective detailed view of the hanging clip of the invention.
Figure 4:
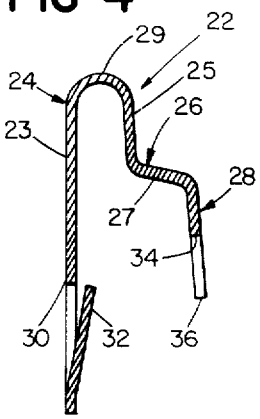
FIG. 4 is a section taken along lines 4—4 of FIG. 3.

In operation, the picture, mirror, or the like 38 is placed on ledge 18 of frame 12. If necessary, a layer of filler material 39, such as corregated cardboard, is placed over the back of the picture so that, when back plate 20 is inserted, the contents of the frame will be frictionally held in position. After clip 22 is placed on the desired edge of back plate 20 (FIG. 1), the plate is slid through open end 13 into opposing grooves 40, 42 until it enters end groove 44. The frame is then hung by resting notch 34 on a nail, screw or the like or be resting spacing portion 26 on a wire. If the frame hangs at an angle, the clip 22 may be adjusted (FIG. 2) by laterally sliding it along frame element 14 and backing plate edge 21 to insure balanced weight distribution. The weight of the frame and its contents is supported by the clip through the firmly affixed frame element 14. The back plate is held in place by the friction hold of the sides 16 of grooves 40, 42 and 44 or by filler material 39. When the clip is to be mounted on end groove 44, gripping cutout 32 is pressed into the interior surface of back plate 22 (FIG. 5) before being inserted in the frame element. This grip, combined with the aforementioned frictional hold, prevents plate 20 from falling out through the open end 13 of frame 12.

Other embodiments are within the following claims.

What is claimed is:

1. A picture frame assembly comprising:

a frame element having inwardly facing, opposed, recesses in opposite sides thereof in a common plane;

a rigid back plate having front and rear faces with its side edges and one edge receivable within said recesses; and an integral hanging clip having:

a U-shaped retaining portion positioned between one of said recesses and one of said edges and retained thereby for sliding movement therealong; [and]

an offset hanging portion extending inwardly from said frame element and being outwardly spaced from the exterior face of said back plate for receiving an external hanging device between said clip and said back plate to support said frame assembly from a wall or the like; *and,*

*a spacing portion intermediate and connected to said retaining portion and said offset hanging portion and extending generally transversely of said clip.*

2. A picture frame assembly comprising:

a frame element having inwardly facing, opposed, generally U-shaped grooves in opposite sides thereof and a similar groove in one end thereof, all in a common plane, the other end of said frame element being open in said plane;

a rigid back plate having front and rear faces with its side edges and one end edge slideably receivable within said grooves through the open end of said frame element; and an integral hanging clip having:

a U-shaped retaining portion positioned between one of said grooves and one of said edges and retained thereby for sliding movement therealong; [and]

an offset hanging portion extending inwardly from said frame element and being outwardly spaced from the exterior face of said back plate for receiving an external hanging device between said clip and said back plate to support said frame assembly from a wall or the like; *and*

*a spacing portion intermediate and connected to said retaining portion and said offset hanging portion and extending generally transversely of said clip.*

3. The assembly of claim 2 wherein said hanging portion of said clip has a notch on its lower edge for receiving a hanging device to support said assembly from a wall or the like.

4. The assembly of claim 2 wherein said retaining portion of said clip has gripping means for engaging said back plate.

5. A picture frame assembly comprising:

a frame element having inwardly facing, opposed, generally U-shaped grooves in opposite sides thereof and a similar groove in one end thereof, all in a common plane, the other end of said frame element being open in said plane;

a rigid back plate having front and rear faces with its side edges and one end edge slideably receivable within said grooves through the open end of said frame element, said back plate being frictionally held when received by said element, and an integral hanging clip having a U-shaped retaining portion positioned between one of said grooves and one of said edges and retained thereby for sliding movement therealong; [and]

an offset hanging portion extending inwardly from said frame element and being outwardly spaced from the exterior face of said back plate and having a notch on its lower edge for receiving an external hanging device between said clip and said back plate to support said frame assembly from a wall or the like, said retaining portion of said clip having gripping means for supporting said back plate, *and*

*a spacing portion intermediate and connected to said retaining portion and said offset hanging portion and extending generally transversely of said clip.*

6. The assembly of claim 5 wherein said frame element is made of resilient material and the width of said U-shaped grooves at their inner edges is slightly less than the thickness of said back plate, whereby, said back plate is pinched and frictionally held when received by said element.

7. For use with a picture frame assembly having:

a frame element having inwardly facing, opposed, generally U-shaped grooves in opposite sides thereof and a similar groove in one end thereof, all in a common plane the other end of said frame element being open in said plane; and a rigid back plate having front and rear faces with its side edges and one end edge slideably receivable within said grooves through the open end of said frame element, an integral hanging clip comprising a U-shaped retaining portion having an outer leg and a spaced parallel inner leg adapted to be positioned between one of said grooves and one of said edges and retained thereby for sliding movement therealong;

a spacing portion at the terminal end of said outer leg extending away from said inner leg and a hanging portion extending from said spacing portion in the same direction as said inner leg and parallel thereto, offset from said retaining portion and adapted to extend inwardly from said frame element to be outwardly spaced from the exterior face of said back plate, said hanging portion having hanging means in its edge remote from said spacing portion for receiving an external hanging device between said clip and said back plate to support said frame assembly from a wall or the like.

*8. The assembly of claim 1 wherein said U-shaped retaining portion has an outer leg and a spaced parallel inner leg, and said spacing portion is connected to the end of said outer leg and extends generally away from said inner leg.*

*9. The assembly of claim 8 wherein said inner and outer legs of said U-shaped retaining portion are connected by a spacing portion extending transversely of said clip generally parallel to said spacing portion intermediate said outer leg and second hanging portion.*

*10. The assembly of claim 8 wherein said hanging portion extends from said spacing portion in the same direction as inner leg and generally parallel thereto.*

* * * * *